Figure 1:
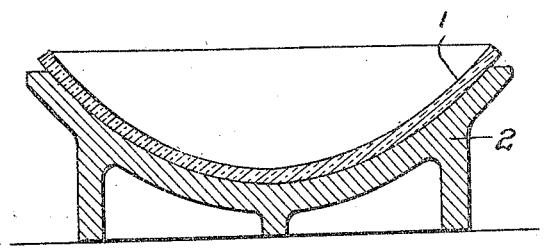

INVENTOR

Patented Dec. 16, 1924.

1,519,277

UNITED STATES PATENT OFFICE.

WILLIAM H. TAYLOR, OF FORD CITY, PENNSYLVANIA, ASSIGNOR TO PITTSBURGH PLATE GLASS COMPANY, A CORPORATION OF PENNSYLVANIA.

PROCESS OF MAKING GLASS BLANKS FOR PARABOLIC REFLECTORS.

Application filed June 5, 1922. Serial No. 566,200.

*To all whom it may concern:*

Be it known that I, WILLIAM H. TAYLOR, a citizen of the United States, and a resident of Ford City, in the county of Armstrong and State of Pennsylvania, have made a new and useful invention in Improvements in Processes of Making Glass Blanks for Parabolic Reflectors, of which the following is a specification.

The invention relates to a process for producing the glass blanks employed in making the large, parabolic mirrors or reflectors for use in searchlights. The securing of an accurate parabolic surface for silvering in large reflectors of this kind has heretofore been a matter of great difficulty and expense. The method commonly employed has been to bend a sheet of plate glass in a form to the approximate parabolic curvature desired and then grind by a machine having the grinder guided by cams or other mechanical means to cut a fixed or predetermined parabolic curvature, after which the glass was polished. The cutting of the desired parabolic curvature by this method is a matter of the greatest difficulty because of the accuracy required (imposed by optical requirements) and because of the compensations necessary to maintain such accuracy during the extended cutting operation and required by the wear in the mechanism and by variations in such mechanism and glass itself due to temperature changes and other conditions. In all cases a great amount of hand manipulation and hand labor are required in finishing of the grinding and polishing in order to make up for the deficiencies in the accuracy of the cutting operation, and in order to true the surface and eliminate zones or bands of unevenness which are almost imperceptible by mechanical measuring instruments, but which show up vividly when the reflector is subjected to optical tests.

The method of the present invention is designed to eliminate to a large extent the difficulty, expense and labor incident to the procedure above set forth. Briefly stated, the method departs from the procedure recited heretofore in that in the bending operation the sheet of plate glass used as a blank, instead of being bent to merely an approximation of the curvature desired in the finished reflector (as was done heretofore), is bent with the greatest possible accuracy and precision to the parabolic curvature desired, after which, instead of cutting with a grinder guided to cut a fixed and predetermined curvature (as was done heretofore), any further finishing, if such finishing is necessary is accomplished by unguided means whose sole design and function is merely to remove a layer of glass of uniform thickness throughout so that the curvature as produced by the original bending is maintained intact in as far as is possible. In other words, the original bent surface acts as a guide and determines the curvature of the finished surface since the grinding action over the entire surface is maintained substantially uniform. After the grinding operation, the polishing operation is carried out upon the same principle as the grinding, namely, a uniform surfacing action which follows the original curvature. It sometimes happens that the removal of the layer of glass in these surfacing operations is not exactly uniform throughout, more glass being taken from the middle of the glass than from its outer portions, but this departure from exact parabolic form is inconsequential in its effect upon the reflector, since the effect of the process, even with this condition present, is to avoid any noticeable deviations or unevenness in passign from one zone upon the glass to another. That is, the deviation in surfacing is so shaded off, that such deviation is not localized at any point and, therefore, does not interfere optically in the use of the lens produced.

The improved method requires the expenditure of a great amount of care and time in the production of a templet or bending mold of the necessary accuracy, but after this mold is once secured, and the proper degree of care observed in the bending operation, the surfacing operation requires only a small fraction of the time and effort required by the methods heretofore employed.

Figure 2:
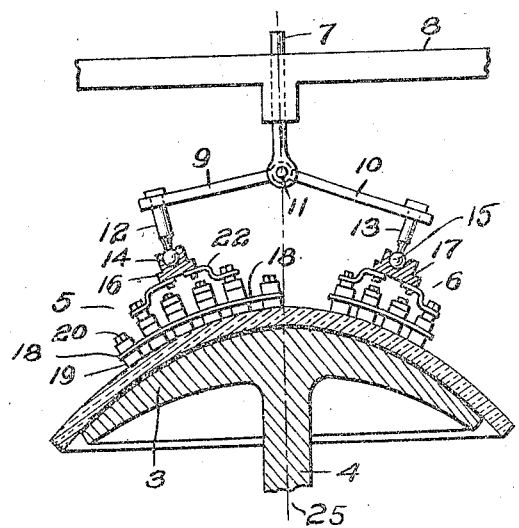
Figure 3:
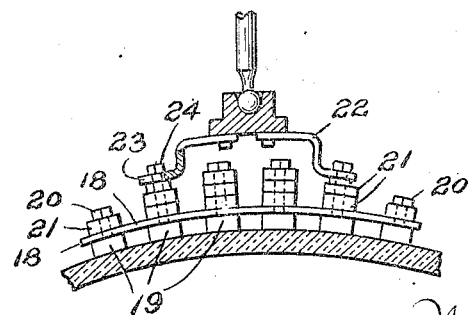

The apparatus employed in carrying out the operation is illustrated in the accompanying drawings as such apparatus serves to indicate the steps of the process. In such drawings:

Figure 1 is a vertical section through the form in which the glass is bent; Fig. 2 is a vertical section through the apparatus on which the blank is ground, the showing being diagrammatic in character; and Fig. 3 is a vertical section on an enlarged scale through the grinding runner which preferably is employed.

The bending of the blank 1 is accomplished in a heavy cast iron mold 2, roughly shown in Fig. 1, such mold being suitably stiffened by ribs so that it will maintain its shape under strains and during repeated heating and cooling. A feature which is vital to the successful practice of the process is the accurate machining of the concave face of the mold to the exact parabolic contour which it is desired to secure in the glass blanks produced. This is accomplished by first laying out a templet on thin sheet steel by geometrical methods to the parabolic form desired and cutting this sheet as accurately as possible to shape. This templet is used as a jig in a boring mill for roughing out the mold after which the mold is annealed and a thin strip of glass laid diametrically across the mold, is bent to parabolic shape in such mold. This strip is then silvered, and by the application of optical methods, and by the use of clamps is bent without the application of heat until it gives the exact parabolic shape desired. The original steel templet is then accurately fitted to this strip of glass by filing, thus giving a templet which has a very high degree of accuracy. The mold is then returned to the boring mill and a finishing cut is given to the concave surface using the templet as a guide. After this machining operation the surface of the mold is then ground or lapped lightly to remove any zones or tool marks remaining after the machining. In this manner a mold is secured having a very high degree of accuracy and as a result, the glass blank 1 which is produced thereon is correspondingly accurate, so that all that is necessary in finishing the blank is to uniformly remove a thin layer of glass.

The glass which is bent in the mold may be a carefully selected sheet of polished plate glass, having its surfaces as nearly flat and parallel as can be secured, but preferably the sheet to be bent is specially ground to secure a blank having the desired flatness and with parallel sides as it is a very difficult matter to find a sheet of plate glass which meets the requirements. The convex face of the blank produced is the one in which accuracy is most necessary since it is the face which is silvered, but it is, of course, highly desirable that the other surface also be as nearly perfect as is possible and to this end it is desirable to employ a blank which is flat upon both sides and has uniform thickness.

In bending the glass, the sheet is laid upon the mold in a furnace with small chips of wood separating the lower face of the glass from the mold. The temperature in the mold is then raised to a point where the glass becomes semi-plastic and sinks down and engages the surface of the mold. Prior to this time, the wood chips are burned out, but the use of the chips prevents the glass and mold from coming into contact until they have reached a relatively high temperature, which is the same for the glass and the iron, so that there is no breakage due to the contact of the glass with a metal of a different temperature. At the finish of the bending operation, the glass does not exactly correspond to the curvature of the iron before heating, due to the difference in the coefficients of expansion, but the departure is so slight as to be negligible.

The convex surface of the glass is then ground on the machine roughly shown in Fig. 2, such grinding being necessary in some cases because of the marring of the face of the glass incident to its contact with the bending mold. This marring, however, is of such a superficial character that only a very thin skin of glass need be removed in order to eliminate the marks or scratches.

This machine comprises a dome 3 upon the vertical driven axle 4 and the runners or laps 5 and 6 supported from the spindle 7 extending through the bridge 8. The spindle 7 is driven by suitable mechanism (not shown) in a direction the reverse of the direction of rotation of the dome 3. The runners 5 and 6 are similar throughout in construction although one is of less diameter than the other as indicated in the drawings. The runners are supported from the arms 9 and 10 which are hinged at 11 on the spindle 7 so as to swing vertically. The ends of these arms carry the posts 12 and 13 which have ball and socket connections 14 and 15 with the blocks 16 and 17 to which the runners are connected.

The runners or laps are preferably made from discs of canvas belting 18 to which are secured cast iron runner discs 19, such disc being preferably about 1½" in diameter and ½" thick and secured to the belting by means of the bolts 20. These cast iron discs are spaced uniformly all over the lower face of the discs 18. Above the blocks 1 are lead weights 21, the outer row of block having one weight, the next few rows having two weights and the remaining interior blocks have three weights. In constructing the runner, the belting is preferably wetted and pressed to fit the curvature of the glass and its flexibility is such that under the influence of the weights, it can adapt itself to the varying curvature of the glass over which it passes. The block 16 is secured the runner by means of a plurality of spring arms 22 of sheet metal whose ends are slotted and extend over the ends of the bol 24. This spider arrangement involving the flexible arms and the loose connection with the bolts 24 serves to drag the lap or runner around over the glass without interfering with its curvature, so that the lap as it moves around is free to adapte itself to the varying contour of the glass.

The bridge 8 which carries the spindle 7 extends transversely over the machine as indicated in Figs. 2 and 3 and is made adjustable longitudinally so that the position of the spindle 7 may be varied throughout the grinding operation, such variation being necessary in order to secure a uniform grinding or surfacing of the entire face of the sheet. In one extreme position of the bridge 8, the spindle 7 is in alignment with the center line 25 of the dome 3, as indicated in Fig. 2, while in the other extreme position of the bridge such spindle is off center with respect to the center line of the dome and the edge of the smaller lap when in its extreme outer position extends about four inches over the edge of the glass blank. The adjustment between these positions is made in four or five stages, the number of stages, distance of adjustment and period of grinding depending on conditions, and being arranged so as to give the greatest uniformity in the grinding operation and the avoidance of zones or bands of unevenness.

The inner or concave surface of the mold is ground by an apparatus similar to that shown in Fig. 2 except that the dome which carries the glass is concave instead of convex and the runners or laps are shaped to fit the concave surface of the blank. It is this apparatus which is employed to grind out or lap the concave surface of the mold 2, as heretofore referred to, in order to remove any tool marks and zones which remain after the final machining operation. This lapping or grinding of the mold is accomplished by the use of the same runners as those used in surfacing the glass, abrasive and water being employed just as in the glass grinding operation.

If the sheets of glass are surfaced to bring their faces to planes in exact parallelism, (by the method of my Patent No. 1,398,050, or some other suitable method) and sufficient care exercised in bending to avoid marring, a finished blank may be produced which requires no grinding whatsoever after bending and in which even polishing may be dispensed with. It will be understood that the term parabolic as used herein is not limited to curvatures which are exactly or mathematically parabolic, the invention is equally applicable where any definite curvature approximating parabolic curvature is desired. Such an approximate curvature is instanced by the ellipsoidal mirror which involves only a slight departure from a parabolic mirror and to the production which my process is adapted. Similarly as to mirrors or reflectors which are parabolic along one diameter and elliptical along a diameter at right angles to the first diameter.

What I claim is:

1. The process of making glass blanks for parabolic reflectors, which consists in bending the blank so that its convex face is of the precise parabolic contour desired in the finished reflector, and then surfacing such convex face using said face as thus secured as a guide in the surfacing operation.

2. The process of making glass blanks for parabolic reflectors, which consists in bending the blank so that its convex face is of the precise parabolic contour desired in the finished reflector, and then surfacing such convex face using said face as thus secured as a guide in the surfacing operation, and removing a layer of glass which is of substantially uniform thickness throughout.

3. The process of making glass blanks for parabolic reflectors, which consists in bending the blank so that its convex face is of the precise parabolic contour desired and then grinding such convex face using said face as thus secured as a guide and applying a substantially uniform grinding action over the surface to secure a finished surface substantially the same in curvature as the original surface.

4. The process of making glass blanks for parabolic reflectors, which consists in regrinding the surface of a sheet of plate glass to reduce such surface to a plane, bending the plate so that the reground face of the plate becomes the convex face of the bent blank and so that such convex face is of the exact parabolic contour desired, and then surfacing such convex face using said face as thus secured as a guide and maintaining the curvature substantially the same during the surfacing.

In testimony whereof, I have hereunto subscribed my name this 1st day of June, 1922.

WM. H. TAYLOR.

Witnesses:
 Fritz Scheeren,
 Tillman Scheeren.